United States Patent
Kersten

(10) Patent No.: US 11,118,371 B2
(45) Date of Patent: Sep. 14, 2021

(54) WIND TURBINE STEEL TOWER RING SEGMENT AND METHOD

(71) Applicant: Wobben Properties GmbH, Aurich (DE)

(72) Inventor: Roy Kersten, Hohenwarthe (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 16/633,921

(22) PCT Filed: Jul. 18, 2018

(86) PCT No.: PCT/EP2018/069534
§ 371 (c)(1),
(2) Date: Jan. 24, 2020

(87) PCT Pub. No.: WO2019/020463
PCT Pub. Date: Jan. 31, 2019

(65) Prior Publication Data
US 2021/0087844 A1 Mar. 25, 2021

(30) Foreign Application Priority Data

Jul. 26, 2017 (DE) .................. 10 2017 116 873.7

(51) Int. Cl.
*E04H 12/08* (2006.01)
*F03D 13/20* (2016.01)
*E04H 12/34* (2006.01)

(52) U.S. Cl.
CPC .......... *E04H 12/085* (2013.01); *E04H 12/34* (2013.01); *F03D 13/20* (2016.05); *F05B 2230/60* (2013.01); *F05B 2240/912* (2013.01)

(58) Field of Classification Search
CPC ....... E04H 12/085; E04H 12/34; F03D 13/20; F05B 2230/60; F05B 2240/912
See application file for complete search history.

(56) References Cited

U.S. PATENT DOCUMENTS 1,765,946 A * 6/1930 Shea ...................... B65D 90/08
220/565
7,802,412 B2 9/2010 Jensen
(Continued)

FOREIGN PATENT DOCUMENTS

DE  102005012497 A1  9/2006
DE  60317372 T2  8/2008
(Continued)

*Primary Examiner* — Patrick J Maestri
(74) *Attorney, Agent, or Firm* — Seed IP Law Group LLP

(57) ABSTRACT

A wind turbine steel tower ring segment, a wind turbine tower portion, a wind turbine tower, a wind turbine and a method for producing a wind turbine tower portion. A wind turbine steel tower ring segment for a wind turbine tower, comprising a shell segment with an extent in the direction of a segment height, of a segment ring direction and of a segment thickness and with a first horizontal joint side and a second horizontal joint side, a first vertical joint side and a second vertical joint side, wherein a first vertical flange is arranged at the first vertical joint side and/or a second vertical flange is arranged at the second vertical joint side, wherein the first vertical flange and/or the second vertical flange enclose(s) an angle with the shell segment, wherein at least one connection element for the arrangement of functional elements is formed on the first vertical flange and/or on the second vertical flange, wherein the connection element projects from the first vertical flange and/or the second vertical flange.

16 Claims, 16 Drawing Sheets

(56) References Cited

U.S. PATENT DOCUMENTS

| | | | |
|---|---|---|---|
| 8,763,313 B2 | 7/2014 | Lyness et al. | |
| 9,200,468 B2 | 12/2015 | Brenner et al. | |
| 2007/0294955 A1* | 12/2007 | Sportel | F03D 13/10 52/40 |
| 2009/0173577 A1 | 7/2009 | Wobben | |
| 2010/0319276 A1* | 12/2010 | Kryger | E04H 12/085 52/173.1 |

FOREIGN PATENT DOCUMENTS

| | | |
|---|---|---|
| DE | 102011077428 A1 | 12/2012 |
| DE | 102014118251 A1 | 6/2016 |
| EP | 1561883 A1 | 8/2005 |
| EP | 2060706 A2 | 5/2009 |
| JP | S6471973 A | 3/1989 |
| WO | 2010/055535 A1 | 5/2010 |

\* cited by examiner

WIND TURBINE STEEL TOWER RING SEGMENT AND METHOD

BACKGROUND

Technical Field

The invention relates to a wind turbine steel tower ring segment, a wind turbine tower portion, a wind turbine tower, a wind turbine and a method for producing a wind turbine tower portion.

Description of the Related Art

Wind turbines are known. Modern wind turbines generally concern so-called horizontal-axis wind turbines, in the case of which the rotor axis is arranged substantially horizontally and the rotor blades sweep through a substantially vertical rotor area. Aside from a rotor arranged at a nacelle, wind turbines generally comprise a tower on which the nacelle with the rotor is arranged so as to be rotatable about a substantially vertically oriented axis.

Towers are generally slim structures which preferably have a large height and which furthermore preferably have relatively small dimensions orthogonally with respect to this height. Towers are preferably composed substantially of concrete and/or steel or comprise these materials. The range of tower designs extends from lattice structures via steel tubular towers with or without cable bracing to concrete structures.

Steel tubular towers may comprise a single component or multiple components or comprise such components. Towers may have cylindrical and/or conical portions, in particular along their longitudinal extent, wherein towers often comprise cylindrical and conical portions. Furthermore, such portions may also be formed in the manner of ring segments, such that a cylindrical portion is made up of different segments in the ring direction or adjacent to one another.

Towers of wind turbines, in particular of modern horizontal-axis wind turbines, account for a major part of the total costs of manufacturing a wind turbine. In particular, the increasing rotor diameters and power outputs of wind turbines mean that the towers are also becoming larger and/or are being subjected to higher loads. Towers are becoming larger firstly in terms of their height and secondly in terms of their diameter, which in many modern wind turbines is already 8 m (meters) or greater. In particular, the manufacture and/or assembly and/or the logistics of the towers is or are time-consuming and expensive. In particular in the case of segmented steel towers, in particular in the case of steel towers which are segmented in a circumferential direction, distortion is often found, which complicates the assembly of the tower.

In the prior art, there are various approaches for reducing the costs and increasing working safety during the manufacture and/or assembly of wind turbine towers. For example, DE 10 2011 077 428 A1 describes a wind turbine tower with a plurality of tower segments, the tower segments abutting against one another at horizontal and vertical flanges and being fastened to one another here. In the German patent applications filed by this applicant on Aug. 8, 2016 and Mar. 22, 2017, different concepts of segmented towers are presented. By contrast, DE 10 2005 012 497 A1 proposes a working platform for an interior of a wind turbine tower, which working platform can be used in the interior of a tower-like structure even if the tower is closed at the top by a superstructure.

The existing systems and methods for building and manufacturing wind turbine towers offer various advantages, but further improvements are desirable.

The German Patent and Trademark Office has searched the following prior art in the priority application relating to the present application: DE 10 2005 012 497 A1, DE 10 2011 077 428 A1, DE 603 17 372 T2, DE 10 2014 118 251 A1 and WO 2010/055 535 A1.

BRIEF SUMMARY

Provided is a wind turbine steel tower ring segment, a wind turbine tower portion, a wind turbine tower, a wind turbine and a method for producing a wind turbine tower portion and may alleviate or eliminate one or more of the stated disadvantages. Provided are techniques which reduces the costs of a wind turbine, in particular the costs of manufacturing and/or assembling a wind turbine tower, and/or increases working safety during the manufacture and/or assembly of a wind turbine.

Provided is a wind turbine steel tower ring segment for a wind turbine tower, comprising a shell segment with an extent in the direction of a segment height, of a segment ring direction and of a segment thickness and with a first horizontal joint side and a second horizontal joint side, a first vertical joint side and a second vertical joint side, wherein a first vertical flange is arranged at the first vertical joint side and/or a second vertical flange is arranged at the second vertical joint side, wherein the first vertical flange and/or the second vertical flange enclose(s) an angle with the shell segment, wherein at least one connection element for the arrangement of functional elements is formed on the first vertical flange and/or on the second vertical flange, wherein the connection element projects from the first vertical flange and/or the second vertical flange.

In the installed state, the segment height of the shell segment is preferably and substantially parallel to a longitudinal axis of the wind turbine tower. In the installed state, the segment ring direction of the shell segment runs substantially parallel to the circumferential direction of the wind turbine tower, such that said segment ring direction runs in a substantially tangential direction. This also applies to non-circular tower cross sections, which may for example have a polygonal geometry. The segment thickness of the shell segment is oriented substantially orthogonally with respect to the segment height and with respect to the segment ring direction, such that the segment thickness is oriented substantially in a radial direction of the wind turbine tower in the installed state.

The first horizontal joint side is preferably arranged opposite the second horizontal joint side. The first horizontal joint side and the second horizontal joint side are furthermore preferably arranged and designed such that the shell segment can be arranged in a suitable manner over a further shell segment. The first vertical joint side is preferably arranged opposite the second vertical joint side, wherein the first vertical joint side and the second vertical joint side are arranged substantially orthogonally with respect to the horizontal joint sides. The first vertical joint side and the second vertical joint side are preferably arranged and designed in such a way as to permit the arrangement of the shell segment adjacent to another shell segment, such that the two or more shell segments arranged adjacent to one another can, adjacent to one another in the ring direction or in the circumferential direction, form a ring.

In order to allow for a tapering geometry of wind turbine towers, it is particularly preferable for the shell segments to have a trapezoidal geometry. The first vertical joint side and the second vertical joint side are therefore not oriented ideally parallel to one another, the deviations from this ideal parallelism being negligible in the present case owing to the large dimensions of a wind turbine tower. Likewise, the orthogonal arrangement of the horizontal joint sides with respect to the vertical joint sides is accordingly described in an idealized manner, wherein, in this case, too, it is not imperatively necessary for there to be a 90 degree angle between a horizontal and vertical joint side, with certain deviations being possible.

The first vertical flange and/or the second vertical flange extend(s) preferably entirely or in certain portions along the first vertical joint side and/or the second vertical joint side. In particular, it is preferable for the first vertical flange and/or the second vertical flange to be formed by a straight portion. The vertical flanges may either be arranged as separate elements at the vertical joint sides, or the vertical flanges are integrally connected to the shell segment. The integral connection of the vertical flanges to the shell segment is preferably implemented such that the vertical flanges are formed as bent end portions of the shell segment. Alternatively, the vertical flanges may for example be welded to the vertical joint sides.

In particular, it is preferable for the first vertical flange and/or the second vertical flange to be arranged and formed so as to be connectable to a vertical flange of an adjacent wind turbine steel tower ring segment. The first vertical flange and/or the second vertical flange may have passage openings which, for example, have a passage direction oriented substantially parallel to the segment ring direction. Thus, the wind turbine steel tower ring segment can be connected to an adjacent wind turbine steel tower ring segment if this adjacent wind turbine steel tower ring segment has corresponding passage openings.

The first vertical flange and/or the second vertical flange enclose an angle with the shell segment, such that they are preferably angled away as viewed from the shell segment. Owing to the angled arrangement of the first vertical flange and/or the second vertical flange with respect to the shell segment, there is particularly advantageously the possibility of connecting the wind turbine steel tower ring segment to an adjacent wind turbine steel tower ring segment by connecting the angled vertical flanges to one another. In particular, the first vertical flange and/or the second vertical flange may enclose an angle with one or two end portions of the shell segment at the vertical joint side.

At least one connection element for the arrangement of functional elements is formed on the first vertical flange and/or on the second vertical flange. In particular, the at least one connection element projects from the first vertical flange and/or the second vertical flange. In particular, it is preferable for the connection element to project from exactly one vertical flange, that is to say from the first vertical flange or the second vertical flange. The connection element may be arranged and designed, such that supporting structures can be arranged thereon.

The welding of supporting structures to shell segments of wind turbine steel tower ring segments often results in distortion of precisely these wind turbine steel tower ring segments. In addition, the material properties of the steel are changed by the introduction of heat during the welding process, such that the wind turbine steel tower ring segment possibly no longer has the material properties, such as strength and/or hardness, that were originally defined and set. The distortion of the shell segment also results in significantly more complex assembly, since the wind turbine steel tower ring segments no longer have an optimal fit as a result of the distortion. This also has the result, inter alia, that the towers are placed under stress during the assembly process, and these stresses can lead to undesirable stress conditions in the tower.

These disadvantages can be alleviated or eliminated by a connection element, wherein said connection element is arranged on one or more of the vertical flanges and projects from there. A wide variety of other devices and/or units and/or elements can then be fastened to this connection element, such that these devices and units that previously had to be arranged in the shell segment can now be fastened directly to the connection element, and are therefore no longer welded directly to the shell segment.

The connection element has the particular advantage that functional elements can be arranged here at low cost. These may for example be supporting structures on which assembly pedestals are arranged. Furthermore, supply devices such as cables or cable harnesses or cable harness holding devices may also be arranged on the connection elements.

In a preferred design variant of the wind turbine steel tower ring segment, provision is made whereby the first vertical flange and/or the second vertical flange and the connection element enclose the same angle with the shell segment, and/or the connection element encloses a connection angle with the shell segment, which connection angle differs from a flange angle which the first vertical flange and/or the second vertical flange enclose(s) with the shell segment. In this design variant, the first vertical flange and/or the second vertical flange can thus be arranged in alignment with the connection element. The connection element preferably forms, so to speak, an elongation of the first vertical flange and/or the second vertical flange. The connection element can thus be arranged particularly inexpensively on the first vertical flange and/or the second vertical flange, wherein simplifications in the course of the manufacturing process are also made possible. Alternatively, the connection elements project in a different direction than the vertical flanges.

In a further preferred design variant of the wind turbine steel tower ring segment, provision is made whereby the connection element extends in the direction of a connection height, of a connection width and of a connection thickness, and/or the connection element has a substantially areal extent owing to the extent in the direction of the connection height and of the connection width, wherein the areal extent is preferably substantially rectangular.

It is furthermore preferable if the first vertical flange and/or the second vertical flange have an extent in the direction of a flange height, which is oriented parallel to the segment height, of a flange width, which is oriented orthogonally with respect to the segment ring direction and orthogonally with respect to the segment height, and of a flange thickness, which is oriented orthogonally with respect to the flange height and orthogonally with respect to the flange width. In particular, the flange thickness may be oriented substantially parallel to the segment ring direction. Furthermore, the connection thickness may preferably be oriented parallel to the flange thickness and/or the connection width may be oriented parallel to the flange width and/or the connection height may be oriented parallel to the flange height.

A further preferred development of the wind turbine steel tower ring segment is distinguished by the fact that the extent of the connection element in the direction of the connection height is smaller, in particular several times smaller, than an extent of the shell segment in the direction of the segment height. By contrast to the shell segment or also the vertical flanges, the extent of the connection element is thus preferably locally limited. It is furthermore preferable if the extent of the connection element in the direction of the connection height is less than 20%, and/or less than 15%, and/or less than 10%, and/or less than 5%, and/or less than 2%, and/or less than 1%, and/or less than 0.1%, of the extent of the shell segment in the direction of the segment height.

A further particularly preferred design variant of the wind turbine steel tower ring segment provides for the areal extent of the connection element to have a surface normal, wherein the surface normal is oriented in the direction of the segment ring direction and/or in the direction of the segment thickness. In particular, it is preferable for said surface normal to have directional components that are oriented parallel to the segment height and to the segment ring direction.

In particular, it is preferable for the connection thickness and the flange thickness to have the same dimension. It is furthermore preferable for the wind turbine steel tower ring segment to comprise a first connection element and a second connection element, wherein the shell segment extends in the direction of the segment height from an upper end to a lower end and/or the first connection element is arranged on the first vertical flange and the second connection element is arranged on the second vertical flange, and wherein the first connection element and the second connection element have the same spacing to the upper end and/or the lower end. This design variant has the advantage in particular that a functional element, in particular a supporting structure, can be arranged on the first connection element and on the second connection element, and a substantially horizontally oriented connecting path between the two connection elements is made possible.

In a preferred design variant of the wind turbine steel tower ring segment, the latter comprises a third connection element and a fourth connection element, wherein the area of the areal extent of the first connection element and of the second connection element is more than two times the size of the area of the areal extent of the third connection element and of the fourth connection element. It is furthermore preferable that the first connection element and the third connection element are arranged on the first vertical flange and the second connection element and the fourth connection element are arranged on the second vertical flange.

In a further preferred design variant of the wind turbine steel tower ring segment, provision is made whereby the shell segment and the first vertical flange and/or the shell segment and the second vertical flange are formed as a single piece, and/or the shell segment and the first vertical flange are formed as a single piece with the connection element, and/or the shell segment and the second vertical flange are formed as a single piece with the connection element. This results in a particularly high-quality wind turbine steel tower ring segment, because no relevant introduction of heat has taken place as a result of welding. Neither the vertical flanges nor the connection elements are arranged on the shell segment by means of a welding process, as a result of which heat would inevitably have been introduced into the shell segment. This would have inter alia the disadvantages already discussed above with regard to the distortion of the shell segment and changed material properties.

A further preferred development of the wind turbine steel tower ring segment is distinguished by the fact that, in a bending portion, which is preferably linear, in the transition between the shell segment and the first vertical flange and/or between the shell segment and the second vertical flange, there is arranged a recess, in particular a recess and/or a through opening, wherein the recess is preferably formed as a gap and/or notch and/or slot and produced in particular by means of milling and/or gouging.

The recess may for example be arranged along a bending line along which the bending takes place. The recess is preferably arranged in a convex and/or concave region of the bending portion. It is also possible for two or more recesses to be arranged in the bending portion. The bending portion is to be understood in particular as a portion in which the starting material is bent, such that the angled vertical flange relative to the shell segment is created. From a technical perspective, the bending portion is thus the portion in which the material is stretched and/or compressed. The bending portion is also the portion in which the shell segment transitions into the vertical flange.

A recess in the bending portion has the particular advantage that the bending process is optimized, in particular by virtue of the required bending forces being reduced. Furthermore, single-piece wind turbine steel tower ring segments with particularly large wall thicknesses are made possible for the first time by such a recess, because the bending forces in the case of large wall thicknesses are too high. The recess may be produced for example by milling and/or gouging. In particular, it is preferable for the recess to be introduced into a flat starting material and, in a subsequent processing process, for the starting material to be bent in such a way that a shell segment and a vertical flange are formed, wherein the recess is located in the bending portion.

In a particularly preferred development of the wind turbine steel tower ring segment, provision is made whereby the shell segment has a part-ring-shaped cross section, wherein a surface normal of the cross section is oriented substantially parallel to the segment height, and the part-ring-shaped cross section has a part-circle-shaped profile, and/or the part-ring-shaped cross section is formed by two or more straight portions, wherein the two or more straight portions are arranged at an angle with respect to one another. In practice, the latter variant with the two or more straight portions is often also referred to as an angled variant.

Furthermore, it is preferable for the wind turbine steel tower ring segment to comprise at least one flange segment with a part-ring-shaped main body which extends from a first end to a second end in the ring direction, with an upper side and a lower side situated opposite the upper side, with an inner peripheral surface and an outer peripheral surface, and with a first main body joint side at the first end and a second main body joint side at the second end, with a flange projection which is arranged on the upper side of the main body and which extends substantially from the first end to the second end in the ring direction, wherein the at least one flange segment is arranged and/or arrangeable at the first horizontal joint side and/or at the second horizontal joint side.

Provided is a wind turbine tower portion, comprising at least a first wind turbine steel tower ring segment according to at least one of the design variants described above and a second wind turbine steel tower ring segment according to at least one of the design variants described above, wherein the first wind turbine steel tower ring segment and the second wind turbine steel tower ring segment abut against one another at at least one substantially vertical joint with vertical flanges, and wherein the first wind turbine steel tower ring segment and the second wind turbine steel tower ring segment are connected to one another at the at least one substantially vertical joint.

Provided is a wind turbine tower comprising two or more wind turbine tower portions according to the preceding aspect arranged one above the other.

Provided is a wind turbine tower for a wind turbine, comprising at least one above-described wind turbine steel tower ring segment, at least one bracket steel tower portion, having a first bracket steel tower ring segment with a first bracket vertical joint side, a second bracket steel tower ring segment with a second bracket vertical joint side, a bracket element which is arranged at a joint and which is connected to the first bracket steel tower ring segment and the second bracket steel tower ring segment, wherein the first bracket steel tower ring segment, with the first bracket vertical joint side, and the second bracket steel tower ring segment, with the second bracket vertical joint side, are arranged against one another at the joint, and wherein the bracket element has a connection element which projects from the bracket element and which serves for the arrangement of functional elements, wherein, preferably, the wind turbine steel tower ring segment is arranged so as to face toward a tower tip of the wind turbine tower and the bracket steel tower portion is arranged so as to be averted from the tower tip.

The bracket steel tower portion preferably corresponds in terms of its configurations and details to the steel tower portion described in the German patent application "Wind turbine steel tower portion for a wind turbine tower and method for production" from the same applicant and dated Jul. 26, 2017. Said application is fully incorporated herein by reference.

The wind turbine tower with at least one above-described wind turbine steel tower ring segment and with at least one bracket steel tower portion makes it possible to combine the advantages of the two configurations with one another. In particular in the regions in which the wind turbine tower is subjected to particularly high loads, which is generally the case in the lower region, it is preferable to use a bracket steel tower portion. In particular in the regions in which the wind turbine tower is subjected to relatively low loads, which is generally the case in the upper region, it is preferable to use an above-described steel tower ring segment.

Provided is a wind turbine comprising a wind turbine tower according to the preceding aspect.

Provided is a method for producing a wind turbine tower portion, in particular a wind turbine tower portion according to the preceding aspect, comprising providing at least a first wind turbine steel tower ring segment and a second wind turbine steel tower ring segment, in particular a first wind turbine steel tower ring segment and a second wind turbine steel tower ring segment according to at least one of the design variants described above, arranging the first wind turbine steel tower ring segment and the second wind turbine steel tower ring segment at at least one vertical joint with in each case one of the vertical joint sides, connecting the first wind turbine steel tower ring segment and the second wind turbine steel tower ring segment at the at least one vertical joint by fastening two adjacent vertical flanges.

In particular, it is preferable for the method to comprise the step of arranging a functional element, for example a supporting unit, on at least one connection element.

The method and its possible developments have features or method steps that make them particularly suitable for being used for a wind turbine steel tower ring segment and its developments. For further advantages, design variants and design details of these further aspects and their possible developments, reference is also made to the description given above with regard to the corresponding features and developments of the wind turbine steel tower ring segment.

BRIEF DESCRIPTION OF THE SEVERAL VIEWS OF THE DRAWINGS

Preferred embodiments of the invention will be discussed by way of example on the basis of the appended figures. In the figures.

DETAILED DESCRIPTION

In the figures, identical or substantially functionally identical or similar elements are denoted by the same reference designations.

Figure 1:
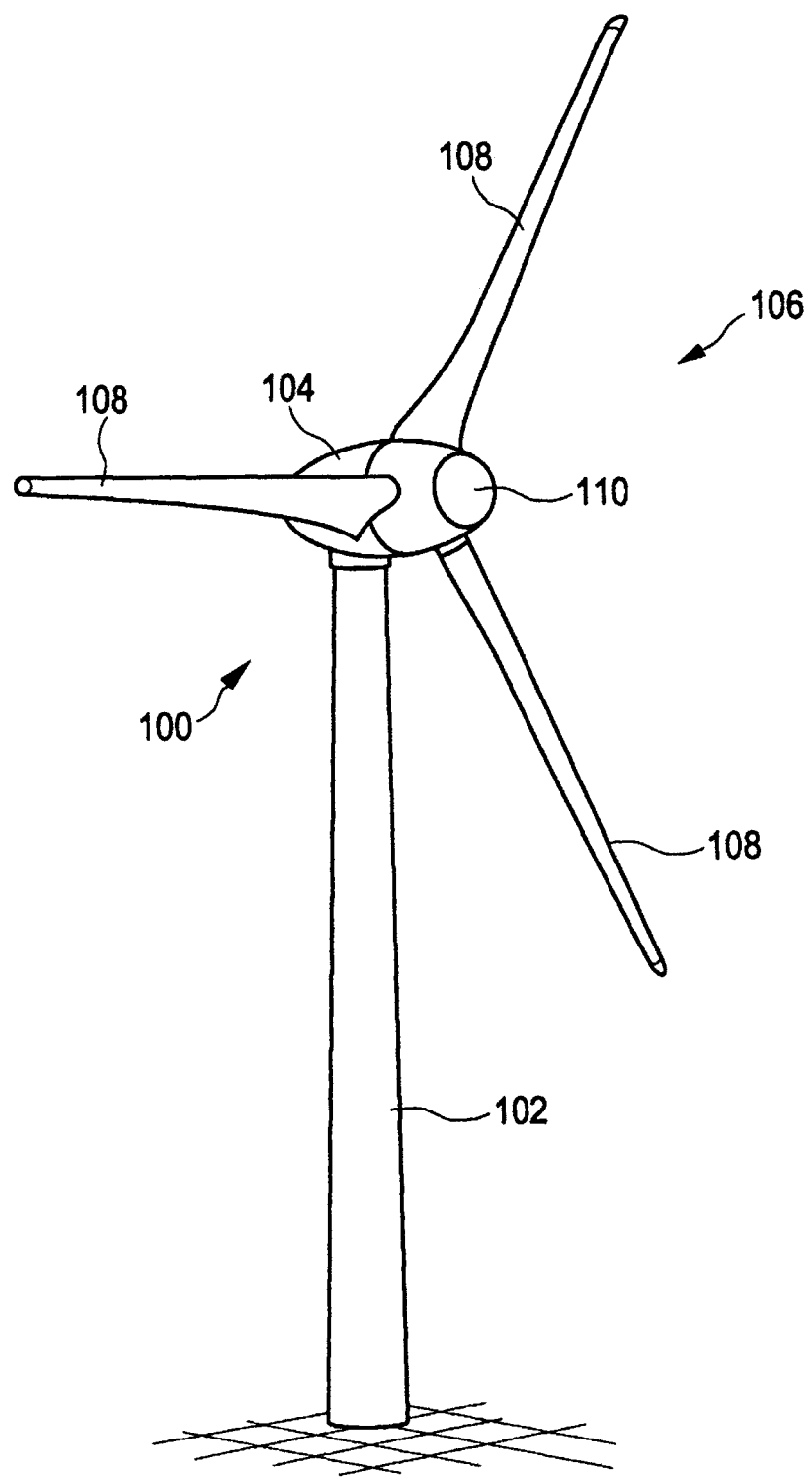
FIG. 1 shows a schematic three-dimensional view of an exemplary embodiment of a wind turbine.

FIG. 1 shows a schematic three-dimensional view of an exemplary embodiment of a wind turbine. FIG. 1 shows in particular a wind turbine 100 with a tower 102 and a nacelle 104. A rotor 106 having three rotor blades 108 and having a spinner 110 is arranged on the nacelle 104. During operation, the rotor 106 is set in rotational motion by the wind and in this way drives a generator at the nacelle 104. The tower 102 comprises in particular a plurality of wind turbine steel tower ring segments with connection elements which are arranged at vertical flanges and which serve for the arrangement of functional elements.

Figure 2:
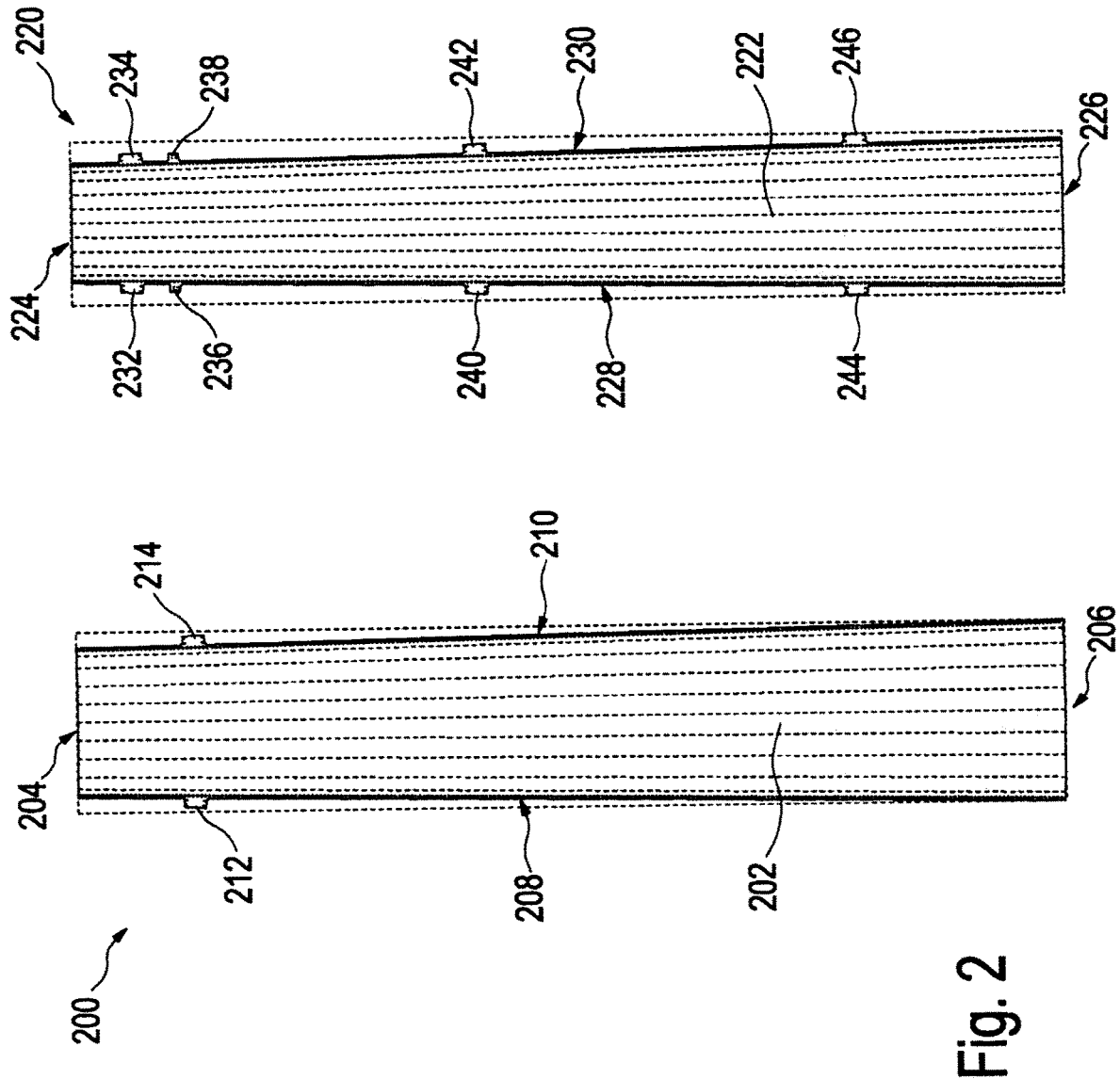
FIG. 2 shows a schematic two-dimensional view of two exemplary embodiments of wind turbine steel tower ring segments.

FIG. 2 shows a schematic two-dimensional view of two exemplary embodiments of wind turbine steel tower ring segments. The shell segment 202 of the steel tower ring segment 200 extends from an upper horizontal joint side 204 to a lower horizontal joint side 206. The first vertical joint side 208 and the second vertical joint side 210 are arranged substantially orthogonally with respect to the horizontal joint sides 204, 206. On the vertical joint sides 208, 210, there are arranged vertical flanges (merely indicated here). In a portion adjoining the first horizontal joint side 204, a first connection element 212 is arranged on the first vertical joint side 208 and a second connection element 214 is arranged on the second vertical joint side 210.

The shell segment 222 of the steel tower ring segment 220 likewise extends from an upper horizontal joint side 224 to a lower horizontal joint side 226 and between a first vertical joint side 228 and a second vertical joint side 230. Adjoining a portion at the first horizontal joint side 224, a first connection element 232 and a third connection element 236 are arranged on the first vertical joint side 228. A second connection element 234 and a fourth connection element 238 are arranged on the second vertical joint side 230. The first connection element 232 has the same spacing to the upper horizontal joint side as the second connection element 234. Analogously to this, the third connection element 236 has the same spacing to the upper horizontal joint side 224 as the fourth connection element 238.

The first connection element 232 and the second connection element 234 have an areal extent which is more than twice the area of the third connection element 236 and of the fourth connection element 238. A fifth and a sixth connection element 240, 242 are furthermore arranged on the steel tower ring segment 220 and are arranged in a central portion of the steel tower ring segment 220. The connection elements 240, 242 also each have the same spacing to the upper horizontal joint side 224 but likewise also to the lower horizontal joint side 226. A seventh connection element 244 and an eighth connection element 246 are furthermore arranged in a portion adjoining the lower horizontal joint side 226.

Figure 3:
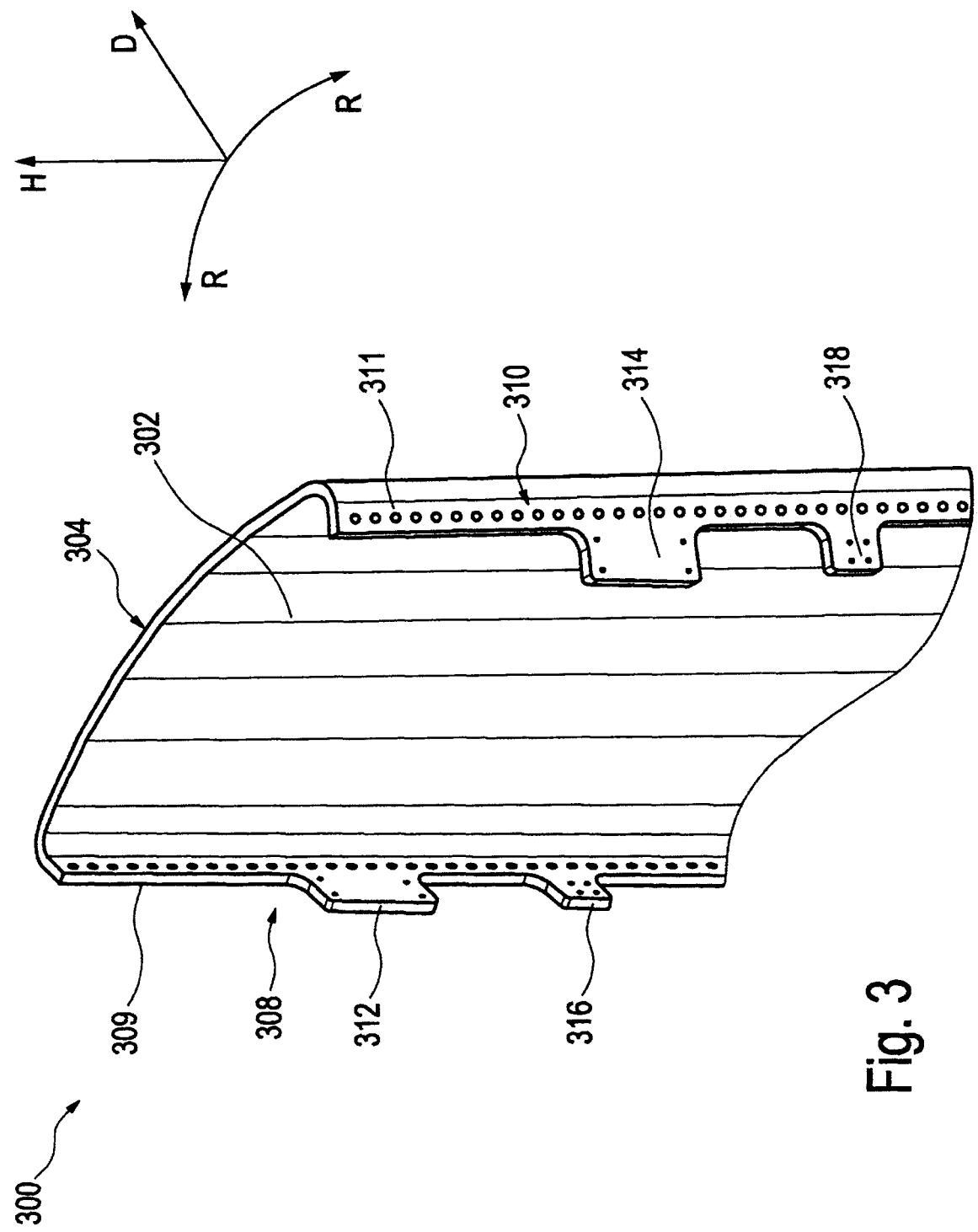
FIG. 3 shows a schematic three-dimensional partial view of an exemplary embodiment of a wind turbine steel tower ring segment.
Figure 4:
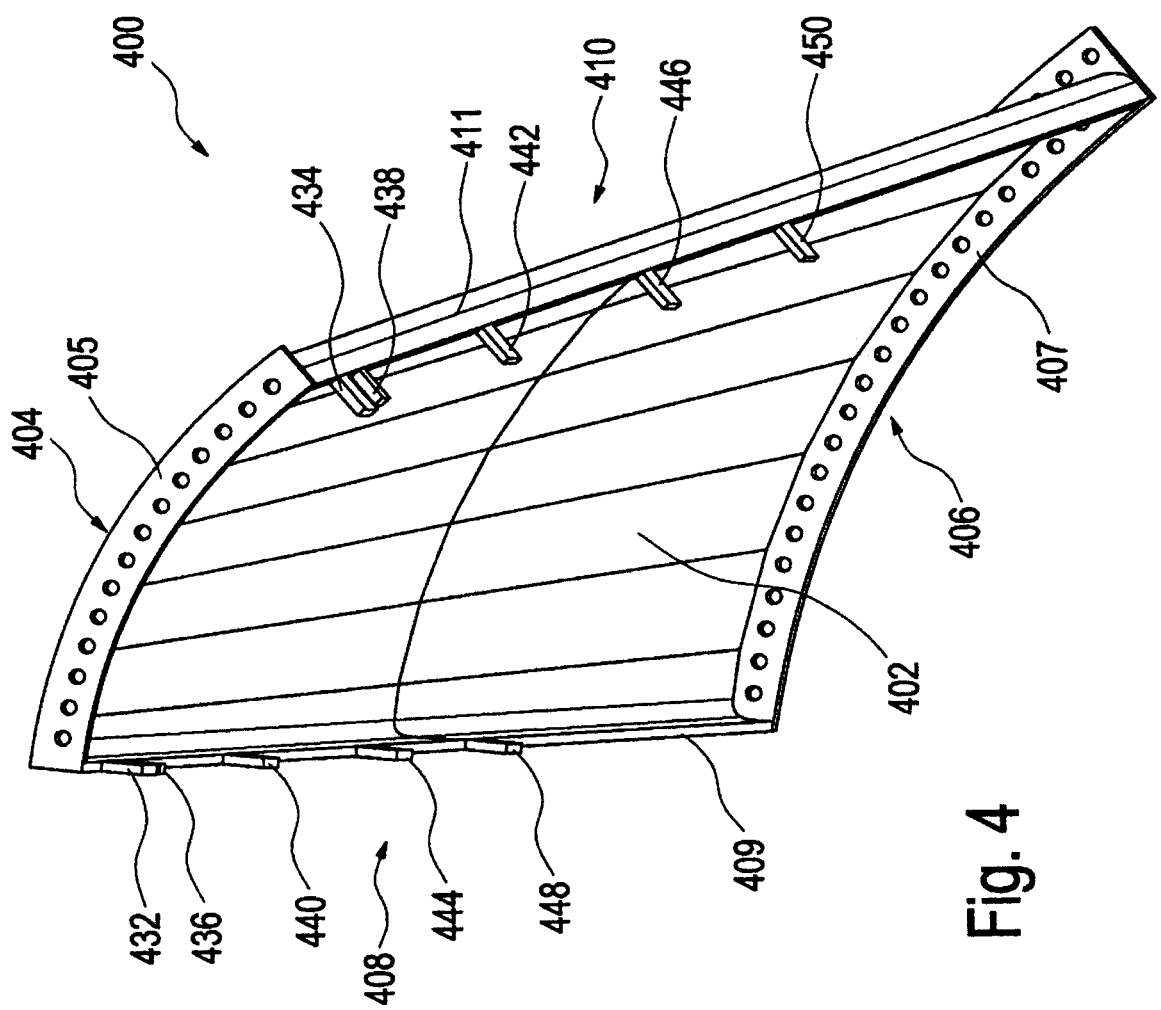
FIG. 4 shows a further schematic three-dimensional view of an exemplary embodiment of a wind turbine steel tower ring segment.
Figure 5:
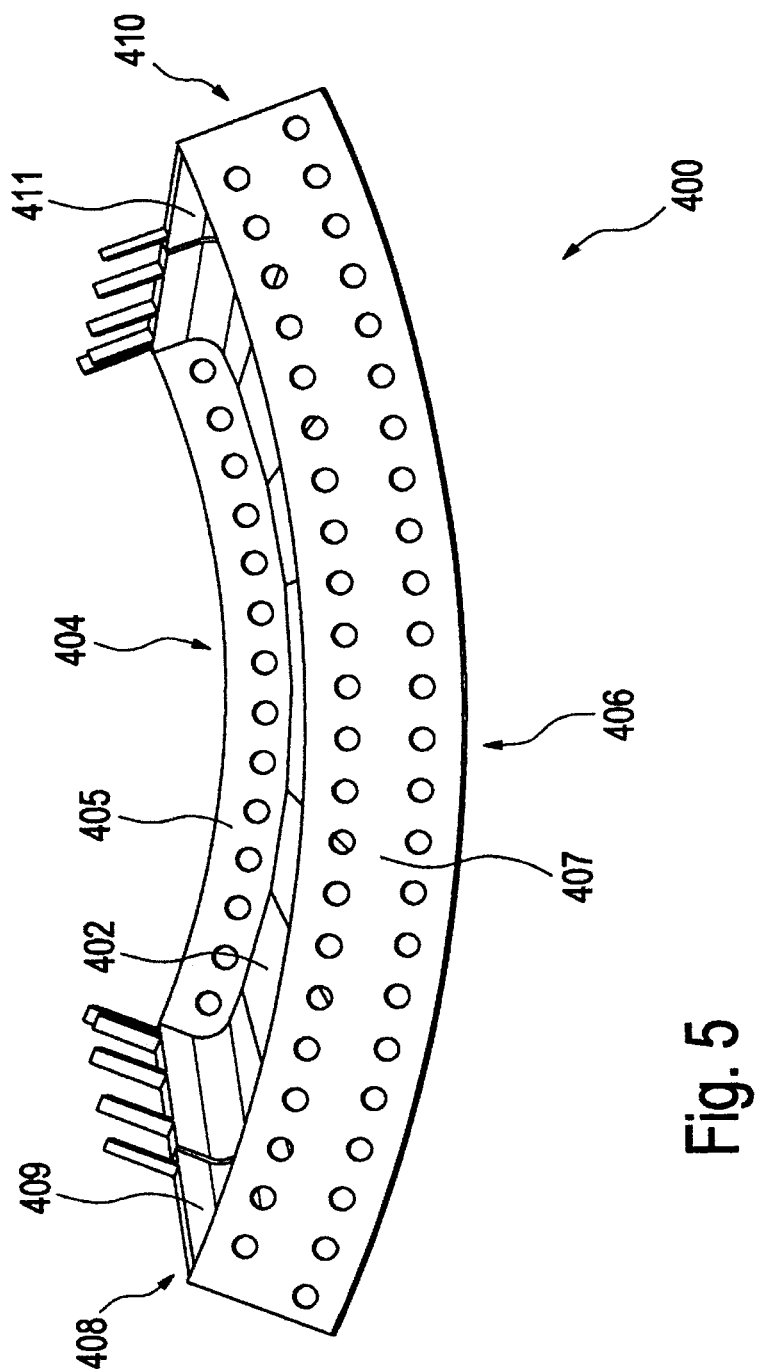
FIG. 5 shows a schematic, three-dimensional end-side view of the wind turbine steel tower ring segment from FIG. 4.
Figure 6:
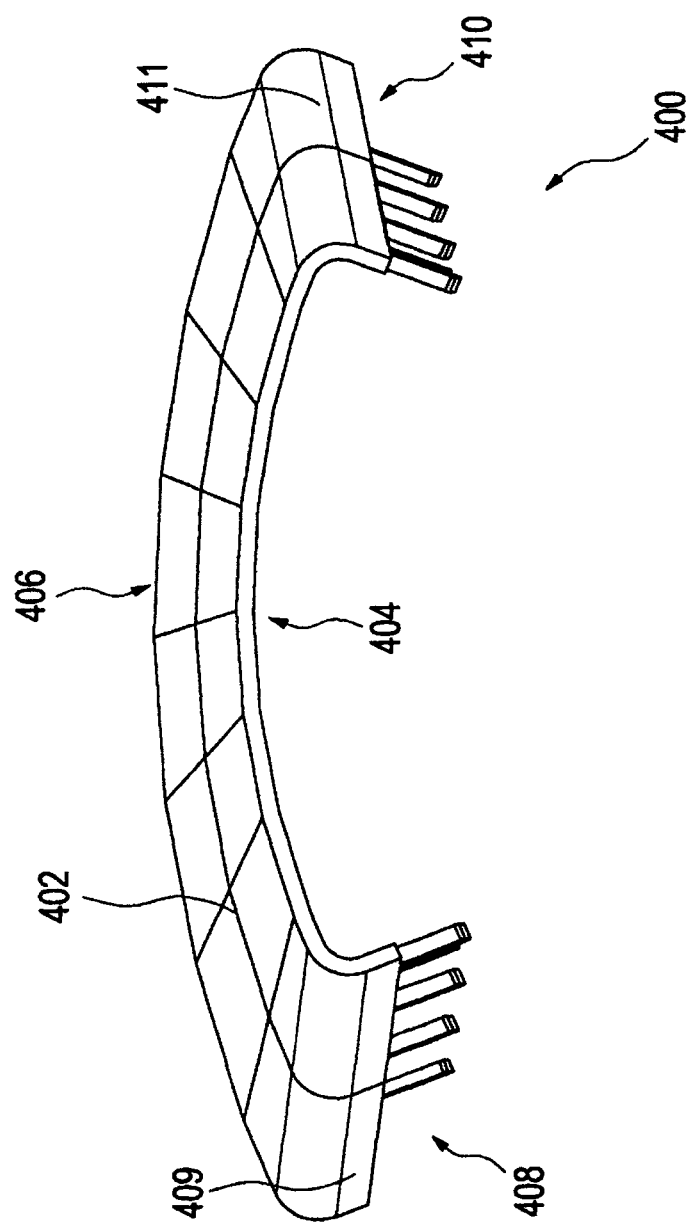
FIG. 6 shows a further schematic, three-dimensional end-side view of the wind turbine steel tower ring segment from FIG. 4.
Figure 7:
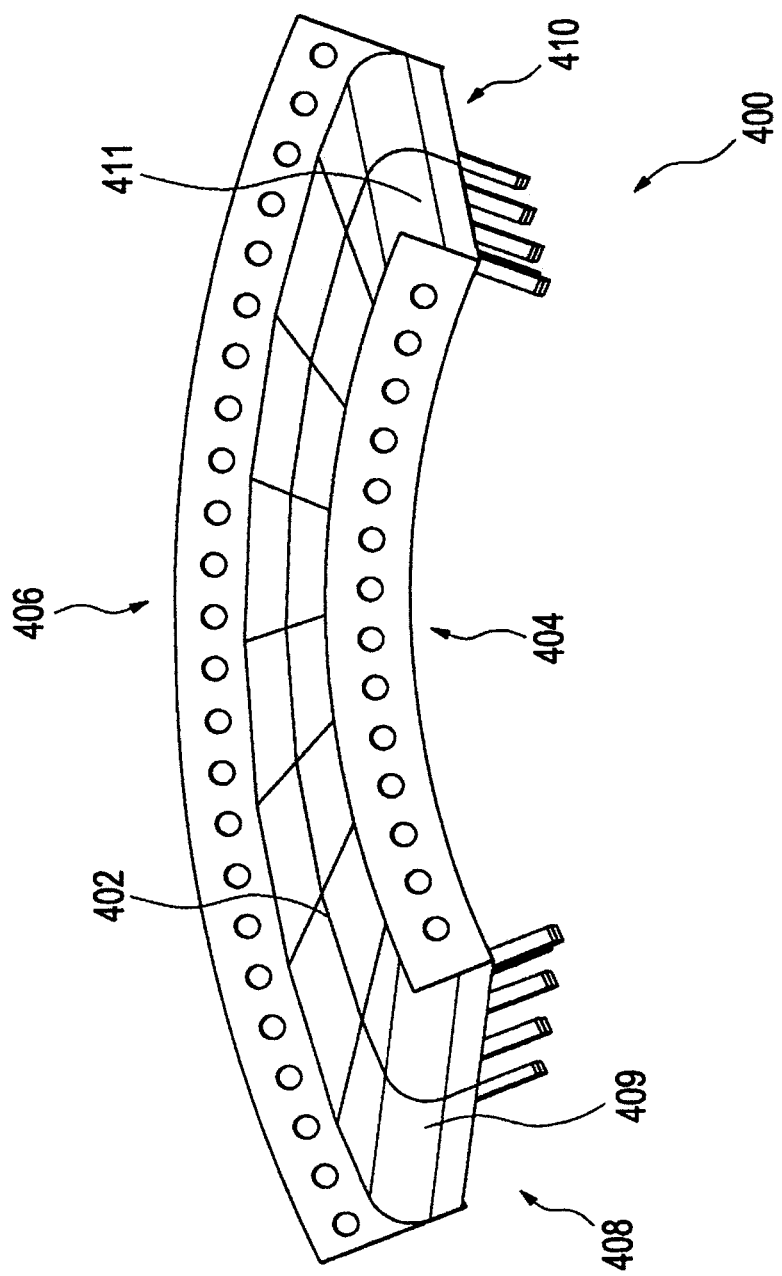
FIG. 7 shows a further schematic, three-dimensional end-side view of the wind turbine steel tower ring segment shown in FIG. 4.

FIG. 3 shows a schematic three-dimensional partial view of an exemplary embodiment of a wind turbine steel tower ring segment. Analogously to the steel tower ring segments described above, the steel tower ring segment 300 has a shell segment 302 which extends from an upper horizontal joint side 304 to a lower horizontal joint side (not shown here) and, orthogonally to this direction of extent, extends from the first vertical joint side 308 to the second vertical joint side 310. A first vertical flange 309 is arranged on the first vertical joint side 308, and a second vertical flange 311 is arranged on the second vertical joint side 310. The vertical flanges 309, 311 each enclose an angle with the shell segment.

A first connection element 312 and a third connection element 316 are formed integrally on the first vertical flange 309, wherein the connection elements 312, 316 extend in the same direction as the first vertical flange 309. Analogously to this, a second connection element 314 and a fourth connection element 318 are formed on the second vertical flange 311 and extend in the same direction as the second vertical flange 311. The connection elements 312, 314, 316, 318 each have an areal extent, the thickness of which in the thickness direction D can also be referred to as material thickness. The thickness or material thickness of the connection elements 312, 314, 316, 318, of the vertical flanges 309, 311 and of the shell segment 302 is substantially equal. The shell segment 302 also has a part-ring-shaped cross section, the surface normal of which is oriented substantially parallel to the segment height in the segment height direction H and the part-ring-shaped cross section is formed by a total of eight straight portions, wherein the eight straight portions are arranged at an angle to one another and also extend in the ring direction R, such that the part-ring-shaped cross section is formed.

FIGS. 4-7 show a schematic three-dimensional view of an exemplary embodiment of a wind turbine steel tower ring segment. The steel tower ring segment 400 has a shell segment 402 which extends from the upper horizontal joint side 404 to the lower horizontal joint side 406 and from the first vertical joint side 408, arranged orthogonally with respect thereto, to the second vertical joint side 410. Arranged on the upper horizontal joint side 404 is an upper horizontal flange 405, which is arranged and designed to connect the steel tower ring segment 400 to a vertically adjacent further steel tower ring segment. Analogously to this, a lower horizontal flange 407 is arranged on the lower horizontal joint side 406. The lower horizontal flange 407 also has passage openings in order to connect the steel tower ring segment 400 to a vertically adjacent further steel tower ring segment. The passage openings of the lower horizontal flange 407 are formed in two rows, such that in each case two are radially spaced apart from one another. The shell segment 402 is arranged between this radial spacing of the passage openings. Therefore, on the one hand, passage openings are arranged on an inner side of the shell segment on the horizontal flange 407 and, furthermore, passage openings are arranged on an outer side with respect to the shell segment 402 on the horizontal flange 407.

The steel tower ring segment 400 also has a plurality of connection elements 432 to 450 on the vertical flanges 409 and 411. A first connection element 432 and a third connection element 436 are arranged on the first vertical flange 409 in a portion adjoining the horizontal joint side 404. The first connection element 432 and the third connection element 436 are directly adjacent and have a small spacing to one another. Analogously to this, the second connection element 434 and the fourth connection element 438 are arranged on the second vertical flange 411. The fifth connection element 440, the seventh connection element 444 and the ninth connection element 448 are furthermore arranged on the first vertical flange 409, wherein the third connection element 436, the fifth connection element 440, the seventh connection element 444 and the ninth connection element 448 are arranged equidistantly with respect to one another. Analogously to this, the fourth connection element 438, the sixth connection element 442, the eighth connection element 446 and the tenth connection element 450 are arranged on the second vertical flange 411. The connection elements 432-450 arranged on a vertical flange 409, 411 may alternatively also be arranged non-equidistantly with respect to one another. The connection elements 432, 434 also have an equal spacing to the upper horizontal joint side 404. The connection elements 432, 434 are thus arranged at the same height. The same applies to the connection elements 436, 438, the connection elements 440, 442, the connection elements 444, 446 and the connection elements 448, 450. Furthermore, the connection elements may each have different spacings from the upper horizontal joint side 404, such that there are no two oppositely situated connection elements which have the same spacing to the upper horizontal joint side 404.

Figure 8:
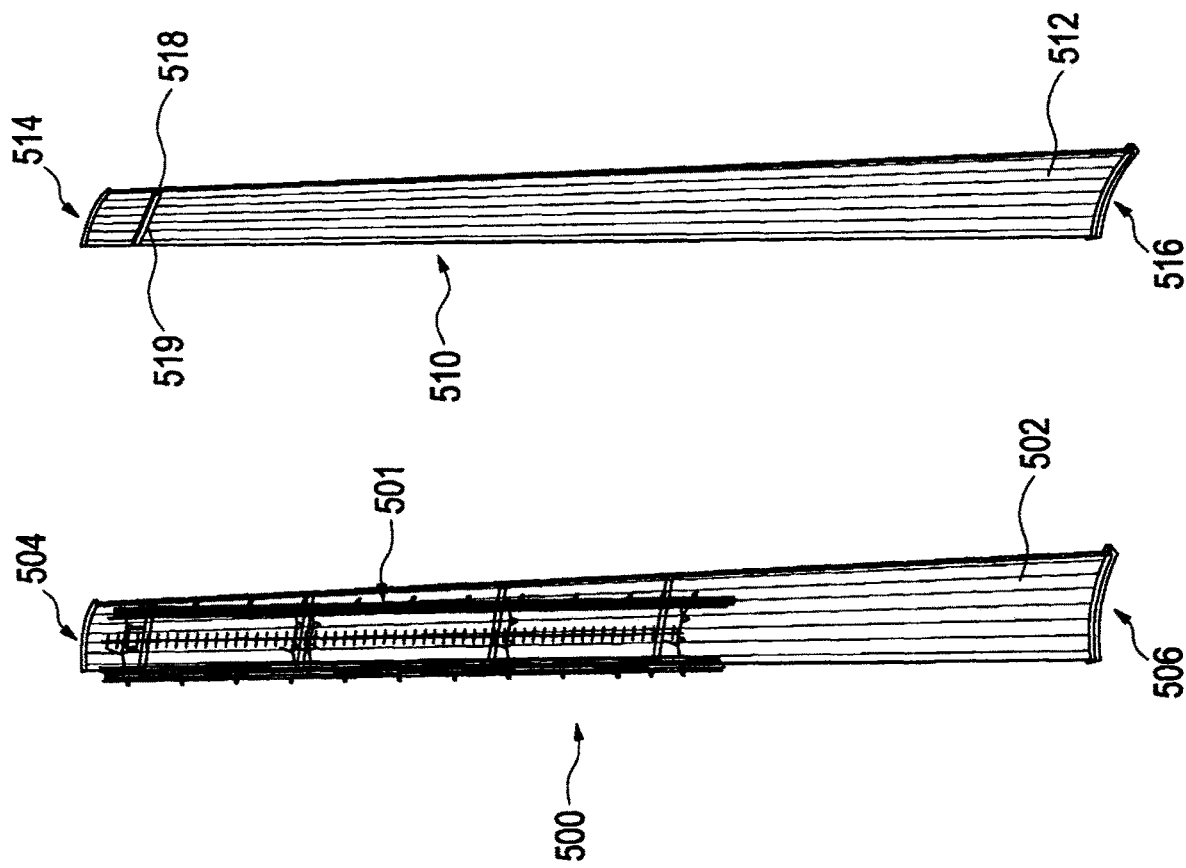
FIG. 8 shows a schematic three-dimensional view of two exemplary embodiments of wind turbine steel tower ring segments.

FIG. 8 shows a schematic three-dimensional view of two exemplary embodiments of wind turbine steel tower ring segments. The first steel tower ring segment 500 has a shell segment 502 which extends from the upper horizontal joint side 504 to the lower horizontal joint side 506. Analogously to the figures described above, on the vertical joint sides, there are arranged vertical flanges, on which in turn connection elements are formed. On the first steel tower ring segment 500, supporting beams are arranged between the connection elements, arranged at equal height, of the first and of the second vertical flange, on which supporting beams a cable ladder 501 is arranged. The arrangement of the supporting beam can be seen in particular from the design of the second steel tower ring segment 510, which likewise extends with its shell segment 512 from an upper horizontal joint side 514 to a lower horizontal joint side 516 and in which a supporting beam 519 extends from a first connection element to a second connection element 518.

Figure 9:
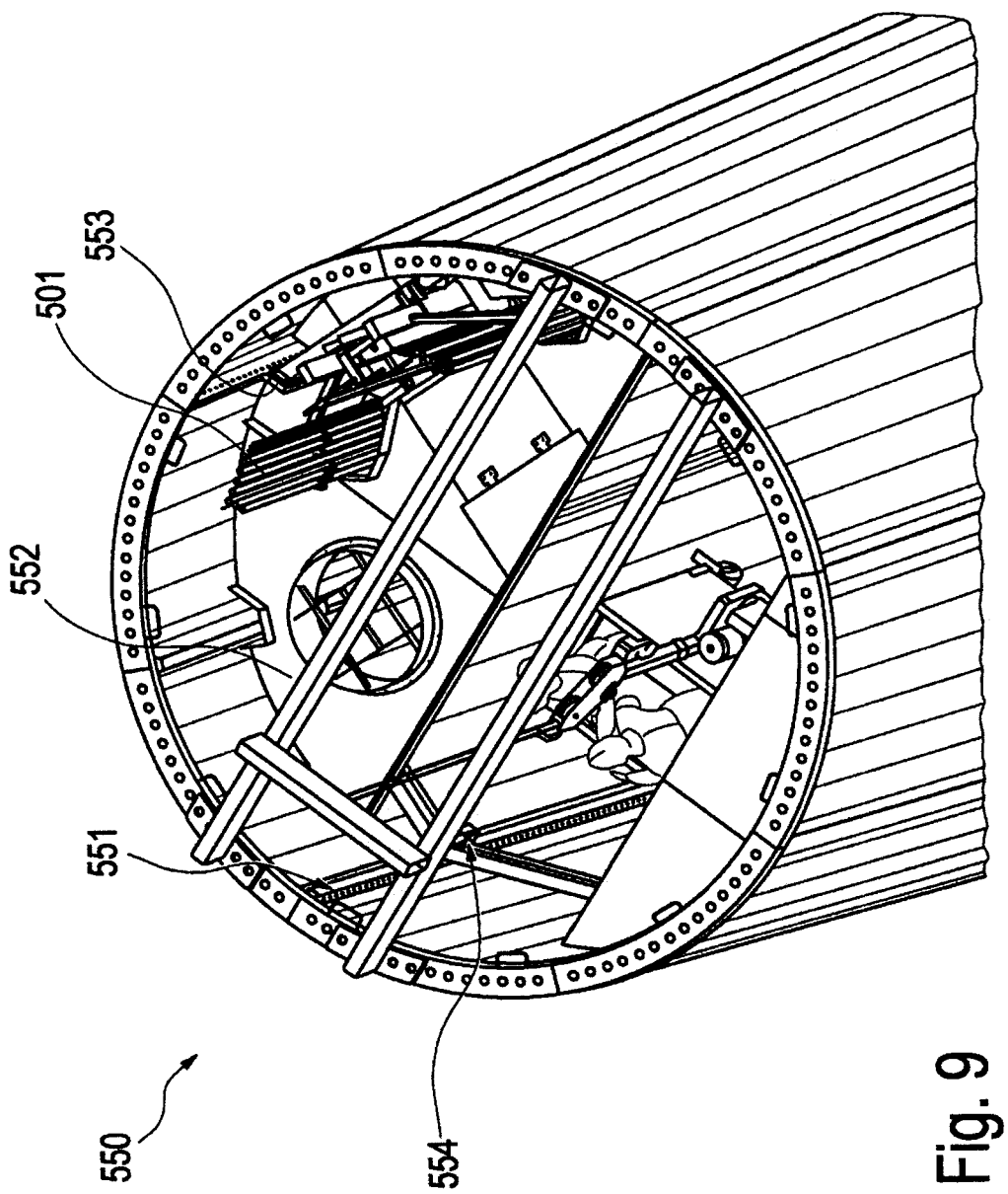
FIG. 9 shows a schematic three-dimensional partial view of an exemplary embodiment of a wind turbine tower.

FIG. 9 shows a schematic three-dimensional view of an exemplary embodiment of a tower. The tower 550 has a total of eight steel tower ring segments which abut against one another with their vertical joint sides at vertical joints 551 and which are fastened to one another there with their vertical flanges. Also shown is the arrangement of a cable ladder 501 which is fastened by means of a supporting beam which is arranged on connection elements 553. Further supporting beams are arranged for example on the connection element 554. Furthermore, a pedestal 552 extends in the horizontal direction.

Figure 10:
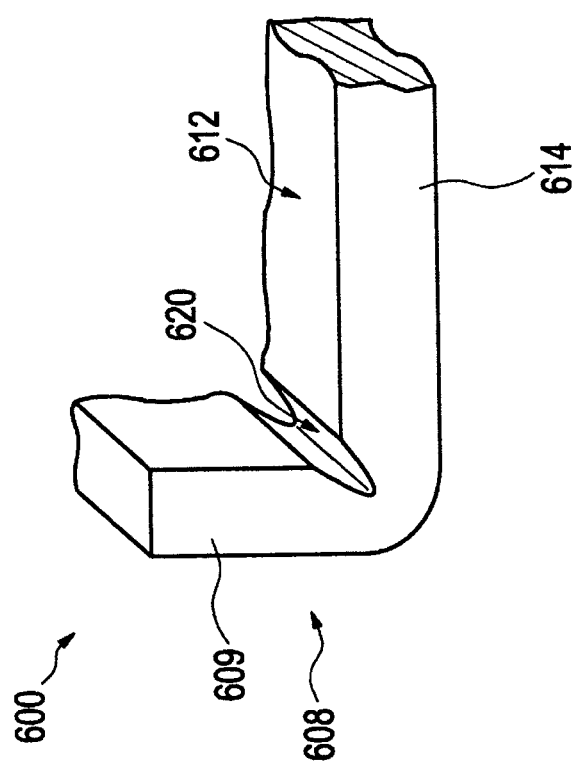
FIG. 10 shows a schematic three-dimensional partial view of an exemplary embodiment of a steel tower ring segment with a recess.
Figure 11:
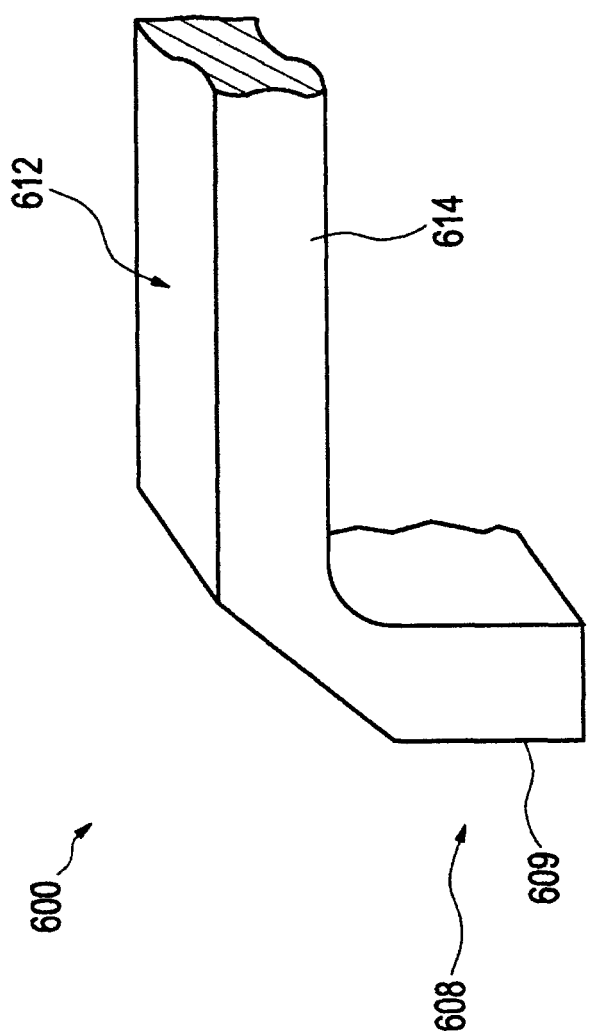
FIG. 11 shows a schematic three-dimensional partial view of the steel tower ring segment from FIG. 10 with an oppositely angled vertical flange.
Figure 12:
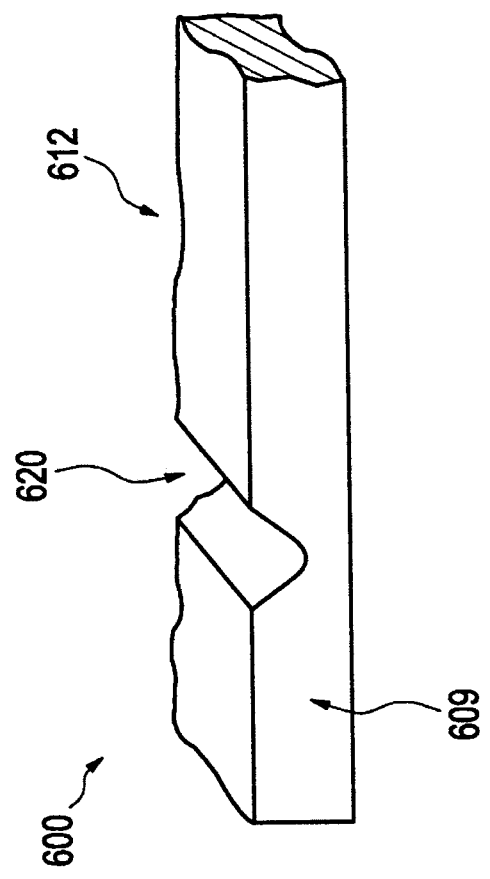
FIG. 12 shows a schematic three-dimensional partial view of a semifinished product for steel tower ring segments shown in FIGS. 10 and 11.

FIGS. 10 to 12 show steel tower ring segments 600 with a shell segment 612 and with a first vertical flange 609 on the first vertical joint side 608 of the steel tower ring segment 600. The perspective in FIGS. 10 to 12 is selected such that the upper horizontal joint side 614 can be seen. In particular, it is possible from FIGS. 10 to 12 to see a recess 620 which is arranged in a bending portion, preferably along a bending line, in the transition between the shell segment 612 and the first vertical flange 609. FIG. 12 shows the starting material for the bending process for the production of a steel tower ring segment 600 with a shell segment 612 and with a first vertical flange 609. In what will become the bending region between the shell segment 612 and the first vertical flange 609, a recess 620 is arranged here as a gap, by means of which recess the material thickness is reduced at least in certain portions in the bending region. In the design variant shown in FIG. 12, this first vertical flange 609 would be bent clockwise and upward in the starting position shown. The bending process would be simplified by the recess 620. In the design variant shown in FIG. 11, the vertical flange 609 is bent counterclockwise relative to the shell segment 612. The recess 620 is a simple and inexpensively producible way of reducing the bending forces to produce a steel tower ring segment 600 according to FIGS. 10 and 11.

Figure 13:
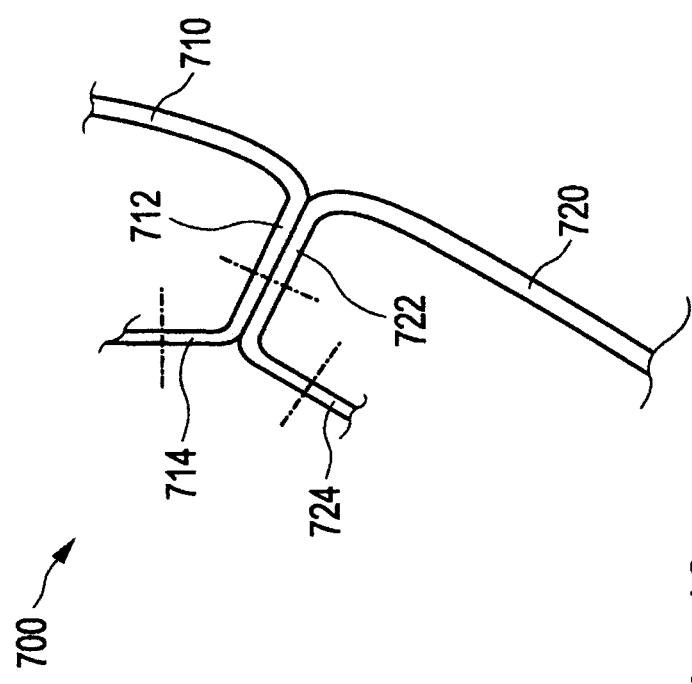
FIG. 13 shows a schematic three-dimensional partial view of an exemplary embodiment of a wind turbine tower portion.

FIG. 13 shows an alternative arrangement of the connection elements 714, 724. The shell segments 710, 720 are arranged to form a wind turbine tower portion 700, wherein the shell segments 710, 720 abut against one another with their vertical flanges 712, 722 at a substantially vertical joint and are connected to one another at the vertical joint. The connection element 714 projects from the first vertical flange 712 and the connection element 724 projects from the second vertical flange 722. The first vertical flange 712 and the connection element 714 enclose an unequal angle with the shell segment 710. The connection element 714 therefore does not extend in the same direction as the vertical flange 712 from the shell segment 710. The connection element 724 is arranged analogously to this. Such connection elements are provided primarily by means of the further angling in particular for support bearers, in the case of which an additional angling of the connection elements in relation to the vertical flanges is advantageous. The support bearers are designed and arranged to receive supports. The supports may be designed for example as beam elements. A platform may be arranged on the supports in the interior of the tower.

Figure 14:
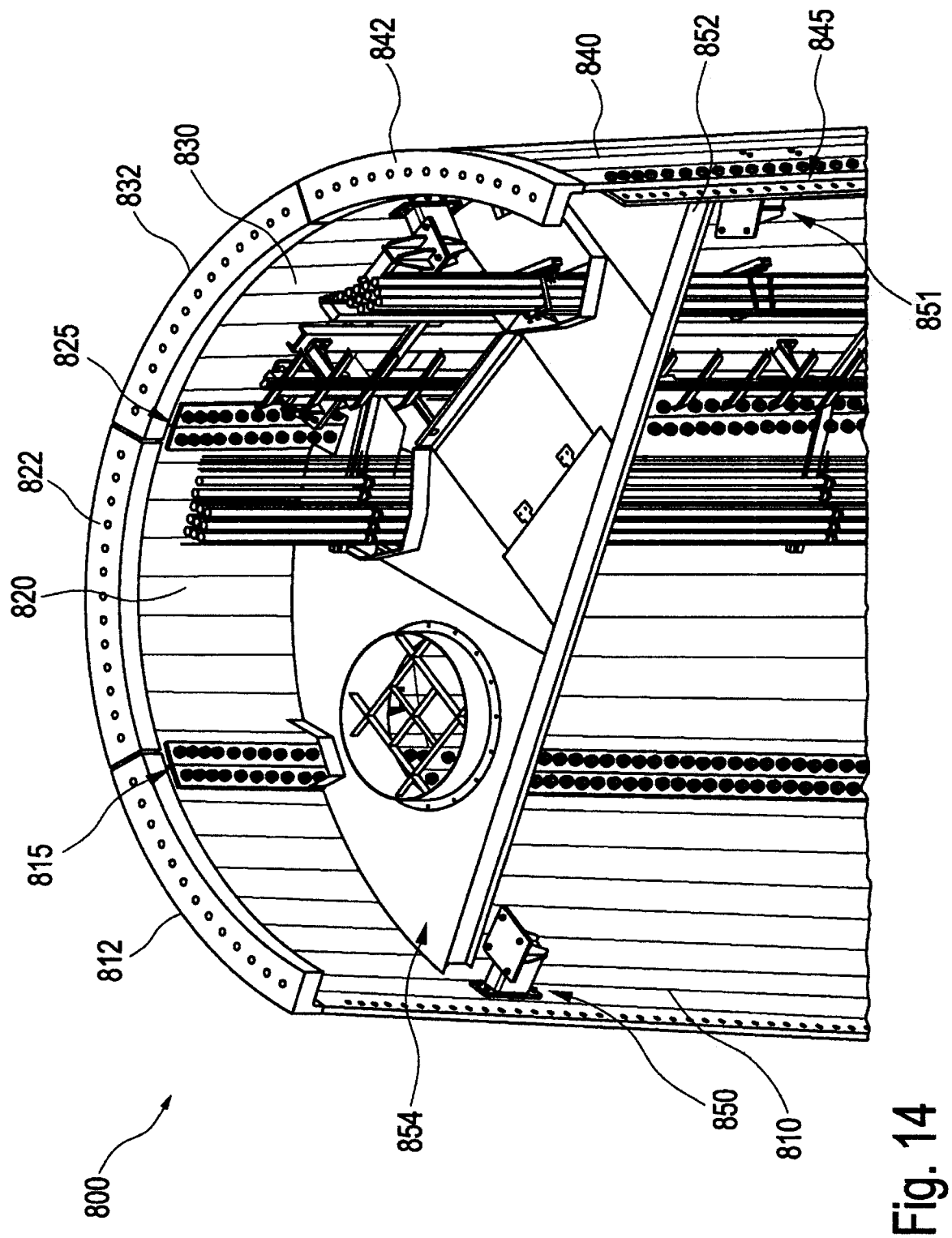
FIG. 14 shows a schematic three-dimensional partial view of a wind turbine tower.
Figure 15:
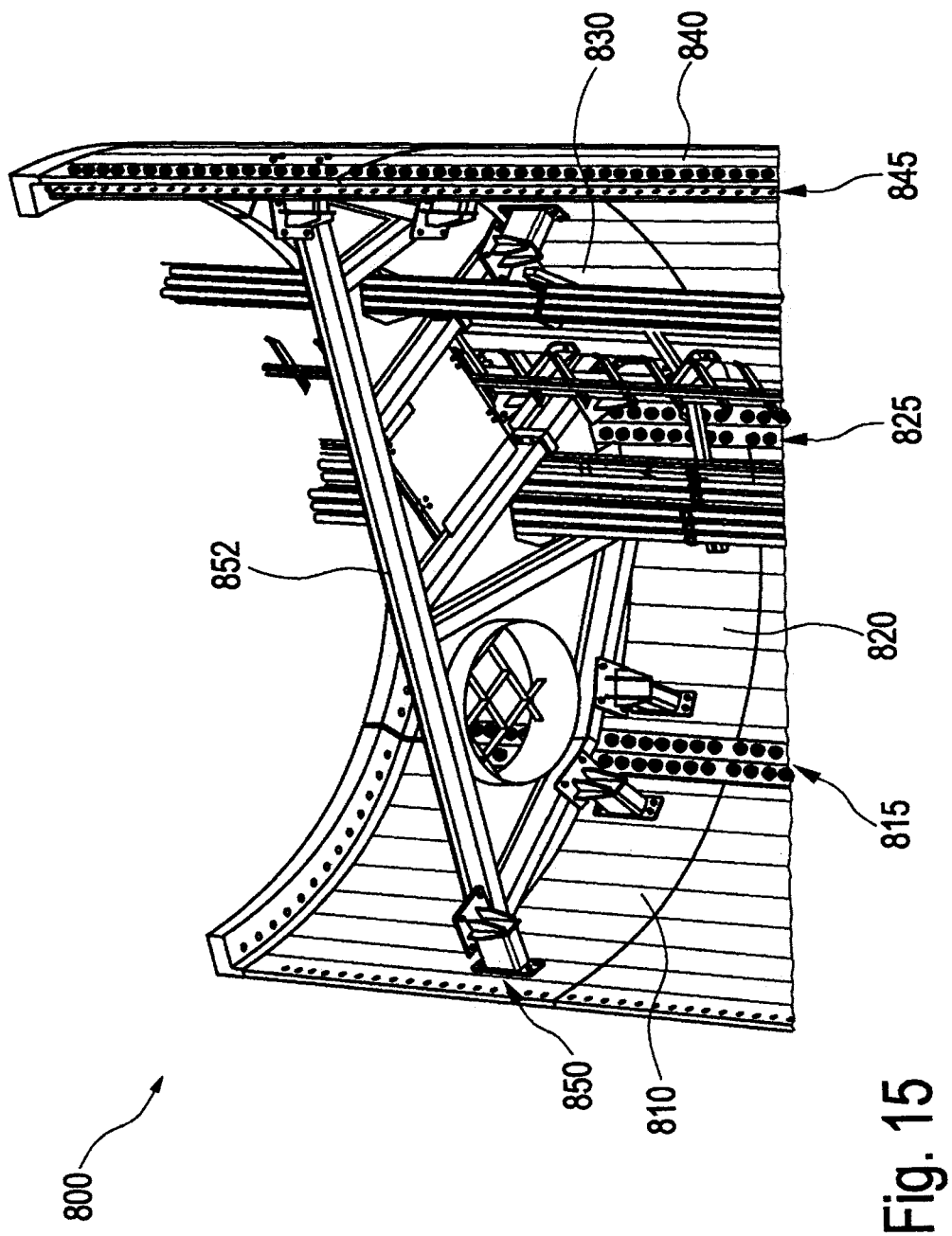
FIG. 15 shows a further schematic, three-dimensional partial view of the wind turbine tower from FIG. 14.

FIGS. 14 and 15 show a schematic three-dimensional partial view of a wind turbine tower. The tower 800 comprises a total of eight steel tower ring segments, of which the first steel tower ring segment 810, the second steel tower ring segment 820, the third steel tower ring segment 830 and the fourth steel tower ring segment 840 are shown. On the upper horizontal joint side of the steel tower ring segments 810, 820, 830, 840, there is arranged in each case one upper horizontal flange 812, 822, 832, 842 which is designed for connecting the steel tower ring segments 810, 820, 830, 840 to one, two or more vertically adjacent tower segments, in particular steel tower ring segments. The first steel tower ring segment 810 and the second steel tower ring segment 820 are connected to one another by means of a bracket element 815, wherein the bracket element 815 is designed as an angled plate and is screwed to the first steel tower ring segment 810 and to the second steel tower ring segment 820. The further steel tower ring segments are connected analogously by means of bracket elements 825, 845. The tower 800 furthermore has a platform 854 which is supported by multiple supports 852. The support 852 is fastened to the tower 800 by means of a first support bearer 850 and a second support bearer 851 arranged approximately diametrically with respect thereto.

Figure 16:
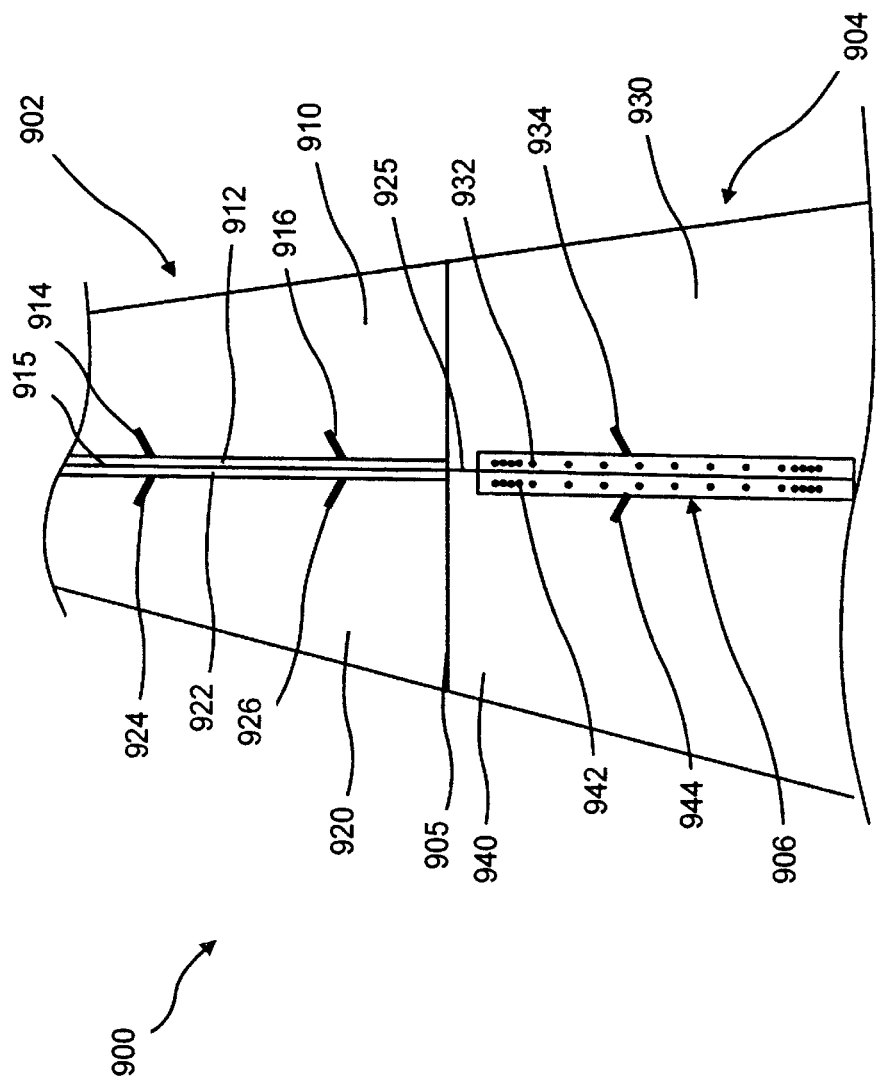
FIG. 16 shows a schematic two-dimensional partial view of an exemplary embodiment of a further wind turbine tower.

FIG. 16 shows a schematic two-dimensional partial view of an exemplary embodiment of a further wind turbine tower. The tower 900 comprises an upper tower portion 902, which faces toward a tower tip of the tower 900, and a lower tower section 904, which faces away from the tower tip of the tower 900. The upper tower portion 902 and the lower tower portion 904 abut against one another at a horizontal joint 905 and are connected to one another in the region of the horizontal joint 905.

The upper tower portion 902 comprises a first steel tower ring segment 910 with a first vertical joint side and a second steel tower ring segment 920 with a second vertical joint side. The first steel tower ring segment 910 and the second steel tower ring segment 920 are arranged horizontally adjacent to one another. The first steel tower ring segment 910 and the second steel tower ring segment 920 abut against one another with their vertical joint sides at an upper vertical joint 915.

A first vertical flange 912 is arranged on the first steel tower ring segment 910 on the first vertical joint side. Analogously, a second vertical flange 922 is arranged on the second steel tower ring segment 920 on the second vertical joint side. The vertical flanges 912, 922 each enclose an angle with the wall-forming portions of the steel tower ring segments 910, 920. On the vertical flanges 912, 922, there are arranged horizontally oriented passage openings (not shown). The passage openings are in particular arranged and designed such that the vertical flanges 912, 922 are connectable to one another by means of fastening elements. By connecting the vertical flanges 912, 922 to one another, the steel tower ring segments 910, 920 are also connected to one another.

A first connection element 914 and a second connection element 916 are formed on the first vertical flange 912 and project from the first vertical flange 912. The connection elements 914, 916 and also all further connection elements described below are arranged and designed in particular for the arrangement of functional elements. Likewise, two connecting elements 924, 926 are formed on the second vertical flange 922 and project from the second vertical flange 922.

The lower tower portion 904 is designed in particular as a bracket steel tower portion, wherein the first and second bracket steel tower ring segments of the bracket steel tower portion are referred to below as third steel tower ring segment 930 and fourth steel tower ring segment 940. The third steel tower ring segment 930 and the fourth steel tower ring segment 940 abut against one another with their respective vertical joint sides at a lower vertical joint 925. Arranged at the lower vertical joint 925 is a bracket element 906 which is connected to the third steel tower ring segment 930 and to the fourth steel tower ring segment 940. The connection is realized in particular with fastening elements 932, 942, wherein the vertical spacing of the fastening elements is greater in a central portion of the bracket element 906 than in the two end portions of the bracket element 906. In the end portions of the bracket element 906, the vertical spacing of the fastening elements is rather chosen to be as small as possible. The third steel tower ring segment 930 and the fourth steel tower ring segment 940 are thus connected to one another and held together at the lower vertical joint 925 by the bracket element 906. The lower tower portion 904 likewise has connection elements 934, 944, wherein the bracket element 906 has the connection elements 934, 944. The connection elements 934, 944 project from the bracket element 906.

By means of connection elements 212, 214, 232 to 246, 312 to 318, 432 to 450, 554, 453 arranged on vertical flanges 309, 311, 409, 411, the quality of a wind turbine tower 550 is increased and the costs for manufacture and assembly are reduced. It has also been found that the connection elements 212, 214, 232 to 246, 312 to 318, 432 to 450, 554, 453 increase working safety during the assembly of a wind turbine tower 550. The cost reduction arises on the one hand because the connection elements 212, 214, 232 to 246, 312 to 318, 432 to 450, 554, 453 can be arranged on the vertical flanges 309, 311, 409, 411 already ex works. Furthermore, the assembly of the individual steel tower ring segments 200, 220, 300, 400, 500, 510 is particularly simplified, because they are subjected to substantially no distortion as a result of the introduction of heat, for example as a result of welding. The assembly process is thus simplified for the technicians on the construction site, wherein, in particular, it is no longer necessary for distorted steel tower ring segments 200, 220, 300, 400, 500, 510 to be connected to one another. Furthermore, the arrangement of a wide variety of functional elements within a tower 550 or a tower to be built is simplified, such that the assembly time can likewise be reduced.

REFERENCE DESIGNATIONS

- 100 Wind turbine
- 102 Tower
- 104 Nacelle
- 106 Rotor
- 108 Rotor blades
- 110 Spinner
- 200 Steel tower ring segment
- 202 Shell segment
- 204 Upper horizontal joint side
- 206 Lower horizontal joint side
- 208 First vertical joint side
- 210 Second vertical joint side
- 212 First connection element
- 214 Second connection element
- 220 Steel tower ring segment
- 222 Shell segment
- 224 Upper horizontal joint side
- 226 Lower horizontal joint side
- 228 First vertical joint side
- 230 Second vertical joint side
- 232 First connection element
- 234 Second connection element
- 236 Third connection element
- 238 Fourth connection element
- 240 Fifth connection element
- 242 Sixth connection element
- 244 Seventh connection element
- 246 Eighth connection element
- 300 Steel tower ring segment
- 302 Shell segment
- 304 Upper horizontal joint side
- 308 First vertical joint side
- 309 First vertical flange
- 310 Second vertical joint side
- 311 Second vertical flange
- 312 First connection element
- 314 Second connection element
- 316 Third connection element
- 318 Fourth connection element
- 400 Steel tower ring segment
- 402 Shell segment
- 404 Upper horizontal joint side
- 405 Upper horizontal flange
- 406 Lower horizontal joint side
- 407 Lower horizontal flange
- 408 First vertical joint side
- 409 First vertical flange
- 410 Second vertical joint side
- 411 Second vertical flange
- 432 First connection element
- 434 Second connection element
- 436 Third connection element
- 438 Fourth connection element
- 440 Fifth connection element
- 442 Sixth connection element
- 444 Seventh connection element
- 446 Eighth connection element
- 448 Ninth connection element
- 450 Tenth connection element
- 500 First steel tower ring segment
- 501 Cable ladder
- 502 Shell segment
- 504 Upper horizontal joint side
- 506 Lower horizontal joint side
- 510 Second steel tower ring segment
- 512 Shell segment
- 514 Upper horizontal joint side
- 516 Lower horizontal joint side
- 518 Connection element
- 519 Supporting beam
- 550 Tower
- 551 Vertical joint
- 552 Pedestal
- 553 Connection element
- 554 Connection element
- 600 Steel tower ring segment
- 608 First vertical joint side
- 609 First vertical flange
- 612 Shell segment
- 614 Upper horizontal joint side
- 620 Recess 700 Wind turbine tower segment
710, 720 Shell segment
712, 722 Vertical flange
714, 724 Connection element
800 Tower
810 First steel tower ring segment
812 First upper horizontal flange
815 First bracket element
820 Second steel tower ring segment
822 Second upper horizontal flange
825 Second bracket element
830 Third steel tower ring segment
832 Third upper horizontal flange
840 Fourth steel tower ring segment
842 Fourth upper horizontal flange
845 Fourth bracket element
850 First support bearer
851 Second support bearer
852 Support
854 Platform
900 Tower
902 Upper tower portion
904 Lower tower portion
905 Horizontal joint
906 Bracket element
910 First steel tower ring segment
912 First vertical flange
914 First connection element
915 Upper vertical joint
916 Second connection element
920 Second steel tower ring segment
922 Second vertical flange
924 Third connection element
925 Lower vertical joint
926 Fourth connection element
930 Third steel tower ring segment
932 Fastening element
934 Fifth connection element
940 Fourth steel tower ring segment
942 Fastening element
944 Sixth connection element
H Segment height
D Segment thickness
R Ring direction

The invention claimed is:

1. A wind turbine steel tower ring segment for a wind turbine tower, comprising:
a shell segment having a segment height, a segment ring direction, and a segment thickness, the shell segment including:
a first horizontal joint side and a second horizontal joint side; and
a first vertical joint side and a second vertical joint side,
a first vertical flange arranged at the first vertical joint side and a second vertical flange arranged at the second vertical joint side, wherein the first vertical flange and the second vertical flange form a respective flange angle with the shell segment,
a first connection element arranged on and projecting from the first vertical flange, and a second connection element arranged on and projecting from the second vertical flange, and
a third connection element and a fourth connection element,
wherein connection heights and connection widths of the first connection element and the second connection element, respectively, is more than two times connection heights and connection widths of the third connection element and the fourth connection element.

2. The wind turbine steel tower ring segment as claimed in claim 1, wherein:
the respective flange angles of the first vertical flange and the second vertical flange form a same flange angle as each other with respect to the shell segment, and
the first and second connection elements form a connection angle with respect to the shell segment, wherein the connection angle differs from the flange angles of the first and second vertical flanges.

3. The wind turbine steel tower ring segment as claimed in claim 1, wherein the first, second, third, and fourth connection elements are rectangular shape in a direction of the connection heights and a direction of the connection widths.

4. The wind turbine steel tower ring segment as claimed in claim 1, wherein the connection heights of the at least the first and second connection elements are smaller than the segment height of the shell segment.

5. The wind turbine steel tower ring segment as claimed in claim 1, wherein each of the first and second connection elements has a surface, wherein the surface is oriented in a direction of the segment height, the segment ring direction, or in a direction of the segment thickness.

6. The wind turbine steel tower ring segment as claimed in claim 3, wherein each of the first, second, third, and fourth connection elements have a connection thickness having a same dimension as a thickness of the flange.

7. The wind turbine steel tower ring segment as claimed in claim 1, wherein the first connection element and the second connection element have a same spacing relative to the first horizontal joint side and the second horizontal joint side.

8. The wind turbine steel tower ring segment as claimed in claim 1, wherein the shell segment and at least one of: the first vertical flange or the second vertical flange are formed as a single piece.

9. The wind turbine steel tower ring segment as claimed in claim 1, wherein:
the shell segment has a partial-ring-shaped cross section, wherein a surface normal to the cross section is oriented substantially parallel to the segment height, and
the partial-ring-shaped cross section has a part-circular-shaped profile.

10. A wind turbine tower portion, comprising:
first and second wind turbine steel tower ring segments, wherein the first and second wind turbine steel tower ring segments are the wind turbine steel tower ring segment as claimed in claim 1,
wherein the first wind turbine steel tower ring segment and the second wind turbine steel tower ring segment abut against one another at their respective first vertical flanges forming a vertical joint, and
wherein the first wind turbine steel tower ring segment and the second wind turbine steel tower ring segment are connected to one another at the vertical joint.

11. A wind turbine tower comprising two or more wind turbine tower portions as claimed in claim 10 arranged one above the other.

12. A wind turbine comprising a wind turbine tower as claimed in claim 11.

13. A method for producing a wind turbine tower portion, the method comprising:
arranging a first wind turbine steel tower ring segment and a second wind turbine steel tower ring segment at respective vertical sides to form a vertical joint;

connecting the first wind turbine steel tower ring segment and the second wind turbine steel tower ring segment at the vertical joint by fastening two adjacent vertical flanges; and arranging a supporting unit at at least one connection element.

14. The wind turbine steel tower ring segment as claimed in claim 4, wherein the connection heights of the first and second connection elements is less than 20% the segment height of the shell segment.

15. The wind turbine steel tower ring segment as claimed in claim 9, wherein the partial-ring-shaped cross section is formed by two or more straight portions, wherein the two or more straight portions are arranged at an angle with respect to one another.

16. The wind turbine steel tower ring segment as claimed in claim 1, wherein the third connection element is arranged on the first vertical flange, and wherein the fourth connection element is arranged on the second vertical flange.

* * * * *